(12) United States Patent
Kim et al.

(10) Patent No.: US 11,900,841 B2
(45) Date of Patent: Feb. 13, 2024

(54) DISPLAY SYSTEM OF VEHICLE AND CONTROL METHOD THEREOF FOR ADJUSTING PROJECTED POSITION OF AUGMENTED REALITY CONTENTS

(71) Applicants: Hyundai Motor Company, Seoul (KR); Kia Corporation, Seoul (KR)

(72) Inventors: Juhyuk Kim, Suwon-si (KR); Huiwon Shin, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 101 days.

(21) Appl. No.: 17/569,927

(22) Filed: Jan. 6, 2022

(65) Prior Publication Data

US 2022/0415224 A1 Dec. 29, 2022

(30) Foreign Application Priority Data

Jun. 23, 2021 (KR) ........................ 10-2021-0081383

(51) Int. Cl.
*G09G 3/00* (2006.01)
*G06F 3/0488* (2022.01)
*G06F 3/04847* (2022.01)
*B60K 35/00* (2006.01)

(52) U.S. Cl.
CPC ............. *G09G 3/002* (2013.01); *B60K 35/00* (2013.01); *G06F 3/0488* (2013.01); *G06F 3/04847* (2013.01); *B60K 2370/12* (2019.05); *B60K 2370/1529* (2019.05); *B60K 2370/177* (2019.05); *G09G 2340/0464* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 10,996,481 B1* | 5/2021 | Wells | B32B 17/10458 |
| 2003/0169213 A1* | 9/2003 | Spero | G02B 27/01 |
| | | | 345/7 |
| 2013/0169679 A1* | 7/2013 | Su | G08G 1/166 |
| | | | 345/633 |
| 2016/0041386 A1* | 2/2016 | Rodriguez Moreno | G06T 7/73 |
| | | | 345/7 |
| 2018/0244153 A1* | 8/2018 | Ejiri | B60R 1/002 |
| 2019/0351767 A1* | 11/2019 | Wall | B60K 35/00 |
| 2020/0219320 A1* | 7/2020 | Moniri | B60K 35/00 |

* cited by examiner

*Primary Examiner* — Jason A Pringle-Parker
(74) *Attorney, Agent, or Firm* — MORGAN, LEWIS & BOCKIUS LLP

(57) ABSTRACT

A display system of a vehicle, and a control method thereof includes: a user input device; a head-up display configured to project a virtual image including augmented reality contents and to adjust a projection position of the augmented reality contents according to predetermined driver viewpoint information and left and right direction offset; and a controller configured to correct the driver viewpoint information or the left and right direction offset according to a control input received through the user input device, wherein the left and right direction offset indicates a degree to which the augmented reality contents are shifted left or right.

11 Claims, 7 Drawing Sheets

DISPLAY SYSTEM OF VEHICLE AND CONTROL METHOD THEREOF FOR ADJUSTING PROJECTED POSITION OF AUGMENTED REALITY CONTENTS

CROSS-REFERENCE TO RELATED APPLICATION

The present application claims priority to Korean Patent Application No. 10-2021-0081383 filed on Jun. 23, 2021, the entire contents of which is incorporated herein for all purposes by this reference.

BACKGROUND OF THE INVENTION

Field of the Invention

The present disclosure relates to a display system of a vehicle, and a control method thereof. More particularly, the present invention relates to a display system of a vehicle, which includes an augmented reality head-up display, and a control method thereof.

Description of Related Art

A head-up display was developed to provide flight information to a pilot during flight by being provided in an aircraft, and has recently been used to more conveniently inform a vehicle driver of vehicle driving-related information.

The vehicle head-up display projects a virtual image on a driver's visible area, that is, on a windshield glass in front of the driver, and the driver visually recognizes the virtual image projected on the windshield glass. Therefore, it is possible to directly see necessary information while the driver is looking ahead, and it can minimize the driver's distraction and contribute to safe driving.

Recently, an augmented reality head-up display that combines the vehicle's head-up display technology and augmented reality technology has been developed. The augmented reality head-up display can provide more realistic and intuitive information by matching vehicle driving-related information, such as navigation information, with the road ahead in real time and projecting the information on the windshield glass.

Meanwhile, although the augmented reality head-up display projects a virtual image in the same position, the image that the driver visually recognizes the virtual image projected on the road ahead may be different depending on the driver's viewpoint position. The driver's viewpoint position may vary depending on the driver's physical condition or posture. Therefore, when a virtual image is projected without considering the driver's physical condition or posture, there is a problem in that the augmented reality contents do not accurately match the desired position on the road.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle display system that supports adjusting a projected position of augmented reality contents of an augmented reality head-up display according to a driver, and a control method thereof.

A display system of a vehicle according to various exemplary embodiments of the present invention includes: a user input device; a head-up display configured to project a virtual image including augmented reality contents and to adjust a projection position of the augmented reality contents according to predetermined driver viewpoint information and first and second direction offset; and a controller configured to correct the driver viewpoint information or the first and second direction offset according to a control input received through the user input device, wherein the first and second direction offset indicates an amount to which the augmented reality contents are shifted left or right.

The display system may further include a display. The controller may display a user interface screen for correcting the driver viewpoint information and the first and second direction offset on the display, and may correct the driver viewpoint information or the first and second direction offset according to the control input received while the user interface screen is displayed.

The user interface screen may include at least one of graphic objects representing a driver's view state which is changed by correction of the driver viewpoint information or the first and second direction offset.

The user interface screen may include view status bars indicating a view status of a lane or a road outline shown to a driver according to the driver viewpoint information or the first and second direction offset.

The controller may increase a slope of the view state bars as a height level of the driver viewpoint information increases, and may decrease the slope of the view state bars as the height level of the drive's viewpoint information decreases.

The controller may shift the view state bars to the left when the first and second direction offset is adjusted to the left, and may shift the view state bars to the right when the first and second direction offset is adjusted to the right.

Furthermore, a control method of a display device that includes a head-up display projecting augmented reality contents on a windshield glass of a vehicle, includes: displaying a user interface screen for correcting driver viewpoint information and first and second direction offset used to determine a projection position of the augmented reality contents; correcting the driver viewpoint information or the first and second direction offset according to a control input received through a user input device; and adjusting a projection position of the augmented reality contents based on the corrected driver viewpoint information or the corrected first and second direction offset, wherein the first and second direction offset indicates an amount to which the augmented reality contents are shifted left or right.

The user interface screen may include at least one of graphic objects representing a driver's view state which is changed by correction of the driver viewpoint information or the first and second direction offset.

The user interface screen may include view status bars indicating a view status of a lane or a road outline shown to a driver according to the driver viewpoint information or the first and second direction offset.

A slope of the view status bar may increase as a height level of the driver viewpoint information increases, and the slope may decrease as the height level of the driver viewpoint information decreases.

The view state bars may be shifted to the first direction when the first and second direction offset is adjusted to the first direction, and shifted to the second direction when the first and second direction offset is adjusted to the second direction.

According to the embodiments, the problem caused by the augmented reality contents of the augmented reality head-up display being matched outside the target position may be solved, improving commerciality of the head-up display and improving quality satisfaction of consumers.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
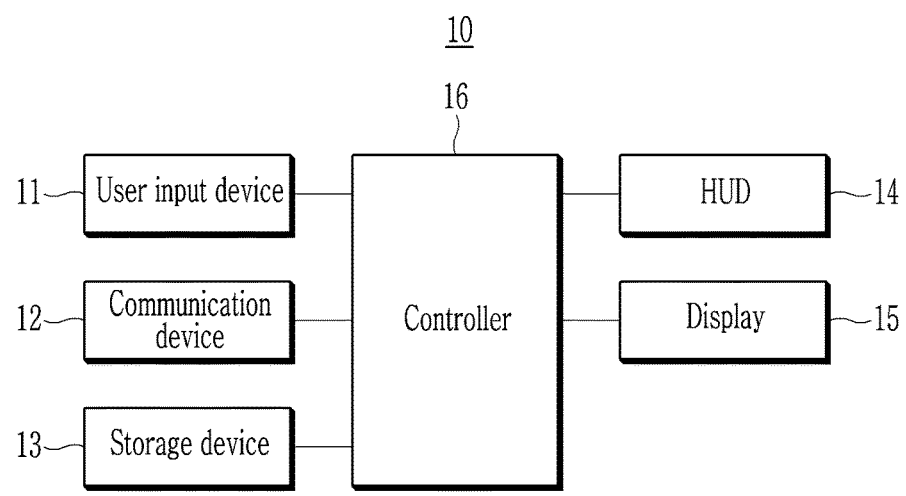
FIG. 1 schematically illustrates a display system of a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, referring to the drawings, embodiments included in the exemplary embodiment will be described in detail, but the same or similar constituent elements are provided the same and similar reference numerals, and overlapping descriptions thereof will be omitted.

The suffixes "module" and/or "-portion" for the constituent element used in the following description are provided or mixed in consideration of only the ease of specification writing, and do not have distinct meanings or roles by themselves. Furthermore, in describing the exemplary embodiment included in the exemplary embodiment, when it is determined that a detailed description of a related known technology may obscure the gist of the exemplary embodiment included in the exemplary embodiment, the detailed description is omitted. Furthermore, the appended drawings are only for easy understanding of the exemplary embodiment included in the exemplary embodiment, and the technical idea included in the exemplary embodiment of the present invention is not limited by the appended drawings, and all changes included in the spirit and technical range of the present invention may be understood to include equivalents or substitutes.

Terms including ordinal numbers such as first, second, and the like may be used to describe various constituent elements, but the constituent elements are not limited by the terms. The terms are used only for distinguishing one constituent element from another constituent element.

When it is mentioned that a certain constituent element is "connected to" or "linked to" another constituent element, it may be directly connected or linked to the other constituent element, but it is understood that another constituent element may exist in between. On the other hand, when it is mentioned that a certain constituent element is "directly connected to" or "directly linked to" another constituent element, it may be understood that another constituent element does not exist in between.

In the present application, terms such as "comprise" or "have" are intended to designate that a feature, number, step, operation, constituent element, part, or combination thereof described in the specification exists, and it may be understood as not precluding the possibility of the presence or addition of and one or more other features, numbers, steps, actions, constituent elements, parts, or combinations thereof.

Furthermore, terms such as "-part", "-group", "module", and "means" described in the specification mean a unit that processes at least one function or operation, which may be implemented by hardware, software, or a combination of hardware or software.

FIG. 1 schematically illustrates a display system of a vehicle according to various exemplary embodiments of the present invention.

Referring to FIG. 1, a display system 10 of a vehicle according to various exemplary embodiments of the present invention may include a user input device 11, a storage device 13, a head-up display (HUD) 13, a display 15, and a controller 16.

The user input device 11 may receive a control input for the display system 10 from a user (driver). The user input device 11 may include various types of an input device such as a touch type, a rotation type, a tilt type, a button type, and the like. For example, the user input device 11 may include a touch pad formed of a touch sensor coupled to the display 15, which will be described later, in a mutual layer structure. The user input device 11 may be a voice recognition device configured for recognizing a user's voice instruction. In the instant case, the user input device 11 may include a microphone for receiving an audio signal corresponding to a user's voice instruction. The user input device 11 may be a gesture recognition device that can recognize a user's gesture. In the instant case, the user input device 11 may further include a camera for photographing an image including the user's gesture.

A communication device 12 connects the display system 10 with an external device (e.g., a user's terminal) through a wireless communication network, and may transmit and receive data, information, a control input, and the like between the display system 10 and the external device.

The storage device 13 may store various pieces of information, data, and the like processed by the display system 10. For example, the storage device 13 may store various data (e.g., menu item lists, graphic objects for displaying each menu item, display characteristics (shape, display positions, and the like) of each graphic object) for displaying a user interface (UI) screen of the display system 10. Furthermore, for example, the storage device 13 may store setting information of the HUD 14 such as driver viewpoint information, a left and right direction offset, and the like. Here, the driver viewpoint information is expressed by estimating the driver's viewpoint position in the display system 10 and matching it to a virtual coordinate space, and the HUD 14 can adjust a projection position of each augmented reality contents included in the virtual image based on the driver viewpoint information. Furthermore, the left and right direction offset is a value that indicates how much the projection position of the virtual image to be shifted in the left and right direction, and based on this, the HUD 14 can shift the projection position of the virtual image or augmented reality contents included in the virtual image to the left and right direction thereof.

The HUD 14 may project a virtual image including information related to vehicle's driving, such as navigation information, driving speed, and lane information, onto the vehicle's windshield glass. The HUD 14 is an augmented reality (AR) HUD, and a virtual image may be projected so that the augmented reality contents included in the virtual image are matched to an actual road through the windshield glass. To the present end, the HUD 14 may control the position at which the augmented reality contents included in the virtual image are projected based on the driver viewpoint information and the left and right direction offset stored in the storage device 13.

The display 15 is a display distinct from the HUD 14, and may display a UI screen for setting the display system 10. The display 15 may be a display included in an audio video navigation (AVN) system of a vehicle, a head unit, a cluster, and the like.

The controller 16 may perform overall control operations of the display system 10. The controller 16 may set the setting information (e.g., driver viewpoint information, left and right direction offset) of the HUD 14 based on the control input received through the user input device 11. To the present end, the controller 16 may display a UI screen for setting the setting information of the HUD 14 through the display 15.

Figure 2:
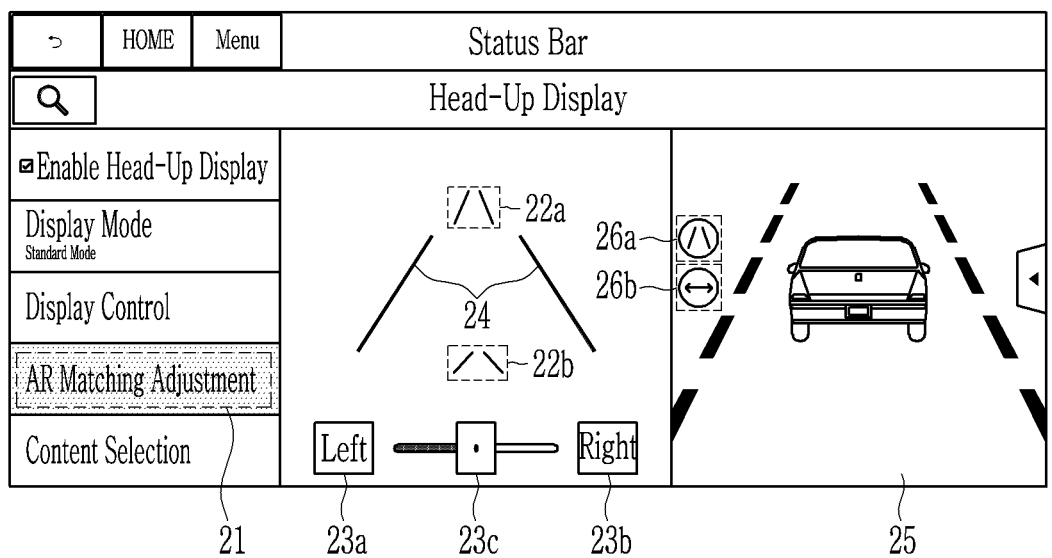
FIG. 2 illustrates an example of a head-up display setting screen provided in the display system according to the exemplary embodiment of the present invention.

FIG. 2 illustrates an example of the setting screen of the HUD 14, provided in the display system 10. Referring to FIG. 2, among the menu items displayed on the setting screen 20, an AR matching adjustment item 21 is a menu item for adjusting the position at which augmented reality contents are matched by adjusting driver viewpoint information and the left and right direction offset among the setting information of the HUD 14. When the AR matching adjustment item 21 is selected from the setting screen 20 by the control input received through the user input device 11, the controller 16 may display touch objects 22a, 22b, and 23a, 23b and 23c for adjusting AR matching and graphic objects 24, 24a, 24b, 25, 26a, 26b, and 27 for displaying an AR matching state on the screen.

Depending on a height of the driver's viewpoint, the shape of the road (e.g., the slope of the lane or road outline) shown to the driver may vary. Thus, to match the augmented reality contents projected through the HUD 14 to the desired position (target position) on the actual road, it is necessary to adjust the position at which the augmented reality contents are projected according to the height of the driver's viewpoint. In the setting screen 20, the touch objects 22a and 22b are touch objects for correcting the viewpoint information of the predetermined driver, that is, touch objects for adjusting a height level upward or downward from predetermined viewpoint information of the driver. The driver can adjust the height level of the driver viewpoint information by touching the corresponding touch objects 22a and 22b.

When the driver's viewpoint moves in the left or right direction, the position matching between the augmented reality contents projected through the HUD 14 and the actual road may be misaligned. As the driver's viewpoint moves to the left, the position at which the augmented reality contents of the virtual image matches the actual road may be shifted to the right. Furthermore, as the driver's viewpoint moves to the right, the position at which the augmented reality contents of the virtual image matches the actual road may be shifted to the left. Thus, to match the augmented reality contents projected through the HUD 14 to the target position on the actual road, it is necessary to shift the projected position of the augmented reality contents to the left and right direction according to the left and right direction position of the driver's point of view. In the setting screen 20, the touch objects 23a, 23b and 23c are touch objects for determining the left and right direction offset of the virtual image, that is, touch objects for shifting the projection position of the augmented reality contents included in the virtual image to the left or right direction thereof. The driver may set the left/right direction offset for shifting the projection position of augmented reality contents included in the virtual image to the left or right direction by touching the touch objects 23a and 23b or dragging the touch object 23c.

In the setting screen 20, view status bars 24 may show a change in the view state of the driver, for example, a change in the view state of a road outline or a lane according to predetermined driver viewpoint information and left and right direction offset. Furthermore, a guide image 25 is a virtual road image predicted to be shown to the driver according to predetermined driver viewpoint information and left and right direction offset, and graphic objects 26a and 26b may represent predetermined values of driver viewpoint information and left and right direction offset.

Figure 3:
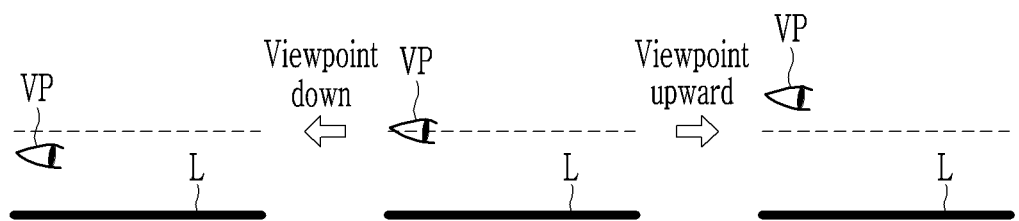
FIG. 3 is provided for description of a change in view state of a driver according to the driver's viewpoint position.
Figure 4:
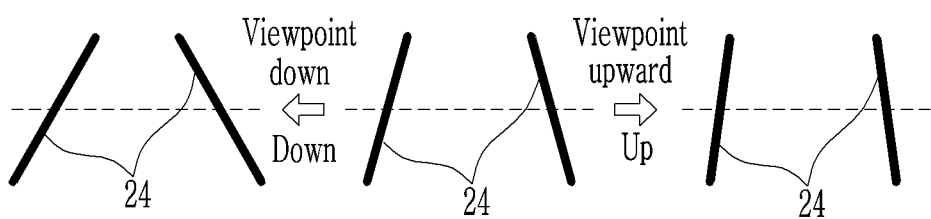
FIG. 4 shows an example that a display state of a view state bar 24 is changed as driver viewpoint information is adjusted in the setting screen 20 of FIG. 2.

FIG. 3 is provided for description of a view state change of the driver according to a viewpoint position of the driver. Furthermore, FIG. 4 shows an example that a display state of a view state bar 24 is changed as driver viewpoint information is adjusted in the setting screen 20 of FIG. 2, and FIG. 5 shows an example that a display state of the view state bar 24 is changed as a left and right direction offset is adjusted in the setting screen 20 of FIG. 2.

Referring to FIG. 3, as a viewpoint VP of the driver goes up, a slope of a lane L shown to the driver increases, and as the viewpoint VP of the driver goes down, the slope of the lane L shown to the driver may decrease. As shown in FIG. 4, as the driver touches the touch object 22a in the setting screen 20 of FIG. 2 to increase a height level, the controller 16 increases slopes of the view state bars 24 and displays the increased slope, and as the driver touches the touch object 22b to reduce the height level, the controller 16 may decrease the slopes of the view state bars 24 and display. Therefore, the driver can intuitively recognize how the view state is adjusted in response to adjusting the height level of driver viewpoint information on the setting screen 20 through the change of the display state (slope) of the view state bar 24.

Figure 5:
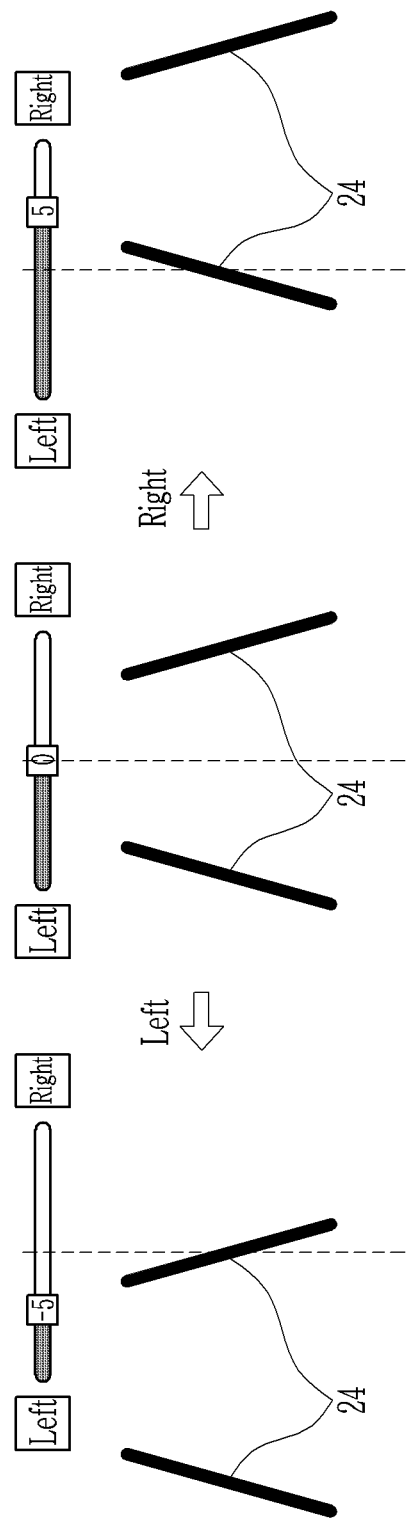
FIG. 5 shows an example that a display state of the view state bar 24 is changed as a left and right direction offset is adjusted in the setting screen 20 of FIG. 2.

As shown in FIG. 5, the controller 16 moves the view status bars 24 to the left as the touch object 23*a* is touched or the touch object 23*c* is dragged to the left on the setting screen 20 of FIG. 2, and the more the touch object 23*b* is touched or the more the touch object 23*c* is dragged to the right, the controller 16 may move the view status bars 24 to the right. Accordingly, the driver can intuitively recognize how the projection position of each augmented reality contents included in the virtual image is adjusted in response to adjusting the left and right direction offset on the setting screen 20 through the display state change (left and right direction shift) of the view state bar 24.

While the controller 16 is setting the setting information of the HUD 14, that is, while the UI screen for setting the setting information of the HUD 14 is displayed on the display 15, the HUD 14 may be controlled such that the projected position of the augmented reality contents projected through the HUD 14 based on the changed setting information may be adjusted in real time. Accordingly, the driver can intuitively check how the changed HUD 14 setting information acts on the projection of the actual virtual image.

Figure 6:
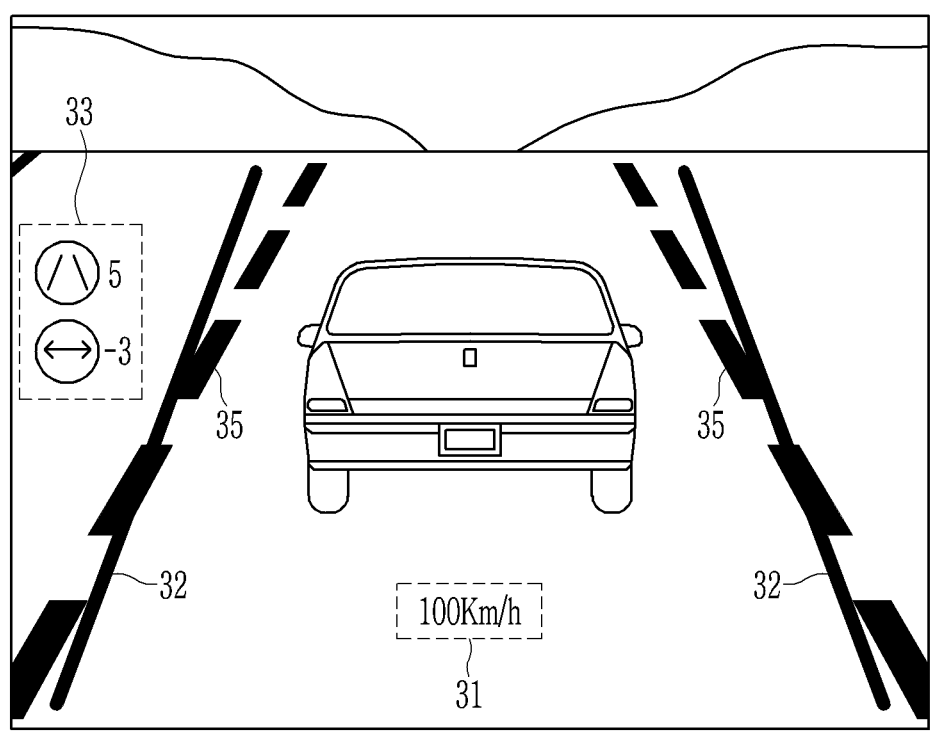
FIG. 6 shows an example of a virtual image projected through a head-up display.

FIG. 6 shows an example of the virtual image 30 projected through the HUD 14 as the setting information is changed, and shows how the virtual image 30 is shown to the driver. Referring to FIG. 6, when the driver viewpoint information or the left and right direction offset is changed, the virtual image 30 projected through the HUD 14 may additionally include graphic objects 31, 32, and 33 that support the driver to intuitively recognize the AR matching state. The graphic object 31 is augmented reality contents, and the driver can check the AR matching status by checking the position where the augmented reality contents 31 are matched on the actual road. The graphic object 32 is guide lines corresponding to the aforementioned view state bar 24, and a slope and a display position of the graphic object 32 may be determined in response to current predetermined driver viewpoint information and left and right direction offset. Therefore, the driver can check the AR matching status by checking the matching status between the guide lines 32 and the actual road lane 35. The graphic objects 33 are graphic objects representing current predetermined values of the driver viewpoint information and left and right direction offset, and the driver may check the graphic objects 33 to determine the current predetermined values of driver viewpoint information and left and right direction offset.

As described above, when the driver viewpoint information or left and right direction offset is changed based on the control input received through the user input device 11, the controller 16 may update the setting information of the HUD 14 stored in the storage device 13 based on the changed driver viewpoint information or left and right direction offset.

Accordingly, the HUD 14 may determine the projection position of augmented reality contents based on the updated driver viewpoint information or left and right direction offset. Here, the HUD 14 may adjust the projection position of the augmented reality contents by shifting the virtual image as a whole or adjusting the position in the virtual image of the augmented reality contents based on the updated driver viewpoint information or left and right direction offset.

Figure 7:
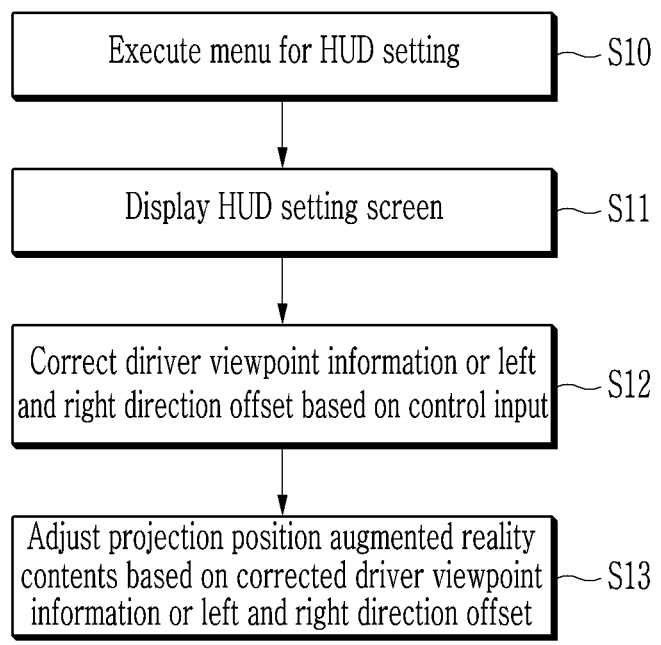
FIG. 7 schematically illustrates a control method of the display system of the vehicle according to an exemplary embodiment of the present invention.

FIG. 7 schematically illustrates a control method of the display system of the vehicle according to various exemplary embodiments of the present invention. The method shown in FIG. 7 may be conducted by the controller 16 of the display system 10 described with reference to FIG. 1 to FIG. 6.

Referring to FIG. 7, the controller 16 executes a menu for setting the HUD 14 based on the control input received through the user input device 11 (S10). Accordingly, a setting screen for setting the HUD 14 may be displayed through the display 15 (S11).

Taking FIG. 2 as various exemplary embodiments of the present invention, a setting screen 20 for setting the HUD 14 includes touch objects 22*a* and 22*b* for adjusting driver viewpoint information, and touch objects 23*a*, 23*b* and 23*c* for adjusting left and right direction offsets of augmented reality contents, and may include graphic objects 26*a* and 26*b* indicating predetermined values of driver viewpoint information and left and right direction offset, and graphic objects 24 and 26 indicating the driver's view state corresponding to predetermined values of driver viewpoint information and left and right direction offset.

The controller 16 may receive a control input through the user input device 11 while the setting screen of the HUD 14 is displayed, and based on the received control input, predetermined driver timing information, or left and right direction offset may be corrected (S12). Furthermore, the controller 16 may adjust the projection position of augmented reality contents by controlling the HUD 14 based on the corrected driver viewpoint information or left and right direction offset when the driver viewpoint information or left and right direction offset is corrected through the step S12 (S13).

According to the above-stated embodiment, the augmented reality contents of the HUD 14 provide a UI for fine adjustment of the matching position on the actual road, and thus, when the augmented reality contents are matched outside the target position by the driver's physical condition or driving posture, the driver can fine-adjust the position at which the augmented reality contents of HUD 14 are projected according to the driver's viewpoint. Therefore, it is possible to solve the problem that the augmented reality contents of HUD 14 are matched out of the target position, improving the merchantability of the HUD 14 and improving the quality satisfaction of consumers.

Meanwhile, in the above-described embodiment, it was exemplarily illustrated that a UI screen for setting the left and right direction offset of driver viewpoint information and augmented reality contents of HUD 14 in the controller 16 mounted in the vehicle is provided, and the predetermined driver timing information and left and right direction offset is set based on the control input received through the user input device 11, but the exemplary embodiment of the present invention is not limited thereto. According to another exemplary embodiment of the present invention, a user terminal (driver terminal) connected to the display system 10 through the communication device 12 displays the UI screen for setting the left and right direction offset of the HUD 14 driver viewpoint information and augmented reality contents through their display, and the controller 16 may adjust the driver viewpoint information and left and right direction offset of the HUD 14 based on the control input received from the user terminal through the communication device 12.

The control method of the display system of the vehicle according to the above-described embodiment may be executed through software. When implemented as software, the components of the present invention are the code segments that perform the necessary work. The program or code segments may be stored on a processor readable medium or transmitted by a computer data signal coupled with a carrier wave in a transmission medium or a communication network.

The computer-readable recording medium includes all kinds of recording devices in which data that can be read by the computer system is stored. Examples of the computer-readable recording medium include ROM, RAM, CD-ROM, DVD_ROM, DVD_RAM, magnetic tape, floppy disk, hard disk, and optical data storage device. Furthermore, the computer-readable recording medium is distributed to the computer devices connected to the network and thus the computer-readable code can be stored and executed in a distributed manner.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A display system of a vehicle, the display system comprising:
   a user input device;
   a head-up display (HUD) configured to project a virtual image including augmented reality contents and to adjust a projection position of the augmented reality contents according to predetermined driver viewpoint information and first and second direction offset;
   a controller configured to correct the driver viewpoint information or the first and second direction offset according to a control input received through the user input device; and
   a display,
   wherein the first and second direction offset indicates an amount to which the augmented reality contents are shifted in a first direction or a second direction,
   wherein the controller is configured to display a user interface screen for correcting the driver viewpoint information and the first and second direction offset on the display and to correct the driver viewpoint information or the first and second direction offset according to the control input received while the user interface screen is displayed,
   wherein the user interface screen includes at least one of graphic objects representing a driver's view state which is changed by correction of the driver viewpoint information or the first and second direction offset, and
   wherein the user interface screen includes view status bars indicating a view status of a lane or a road outline shown to a driver according to the driver viewpoint information or the first and second direction offset.

2. The display system of claim 1, wherein the first direction and the second direction are a left direction and a right direction in a setting screen of the HUD.

3. The display system of claim 1,
   wherein the controller is configured to increase a slope of the view state bars as a height level of the driver viewpoint information increases, and to decrease the slope of the view state bars as the height level of the drive's viewpoint information decreases.

4. The display system of claim 3,
   wherein the HUD includes a setting screen having a touch object, and
   wherein, when the height level is increased in response that the driver touches the touch object in the setting screen, the controller is configured to increase the slope of the view state bars and to display the increased slope on the setting screen, and when the height level is reduced in response that the driver touches the touch object, the controller is configured to decrease the slope of the view state bars and to display the decreased slope on the setting screen.

5. The display system of claim 1,
   wherein the controller is configured to shift the view state bars to the first direction when the first and second direction offset is adjusted to the first direction, and to shift the view state bars to the second direction when the first and second direction offset is adjusted to the second direction.

6. A method of controlling a display system that includes a head-up display (HUD) projecting augmented reality contents on a windshield glass of a vehicle, the method comprising:
  displaying a user interface screen for correcting driver viewpoint information and first and second direction offset used to determine a projection position of the augmented reality contents;
  correcting the driver viewpoint information or the first and second direction offset according to a control input received through a user input device; and
  adjusting a projection position of the augmented reality contents based on the corrected driver viewpoint information or the corrected first and second direction offset,
  wherein the first and second direction offset indicates an amount to which the augmented reality contents are shifted in a first direction or a second direction,
  wherein the user interface screen includes at least one of graphic objects representing a driver's view state which is changed by correction of the driver viewpoint information or the first and second direction offset, and
  wherein the user interface screen includes view status bars indicating a view status of a lane or a road outline shown to a driver according to the driver viewpoint information or the first and second direction offset.

7. The method of claim 6, wherein the first direction and the second direction are a left direction and a right direction in a setting screen of the HUD.

8. The method of claim 6,
  wherein a slope of the view status bar increases as a height level of the driver viewpoint information increases, and the slope decreases as the height level of the driver viewpoint information decreases.

9. The method of claim 8,
  wherein the HUD includes a setting screen having a touch object, and
  wherein, when the height level is increased in response that the driver touches the touch object in the setting screen, the controller is configured to increase the slope of the view state bars and to display the increased slope on the setting screen, and when the height level is reduced in response that the driver touches the touch object, the controller is configured to decrease the slope of the view state bars and to display the decreased slope on the setting screen.

10. The method of claim 6,
  wherein the view state bars are shifted to the first direction when the first and second direction offset is adjusted to the first direction, and shifted to the second direction when the first and second direction offset is adjusted to the second direction.

11. A non-transitory computer readable storage medium on which a program for performing the method of claim 6 is recorded.

* * * * *